US010277321B1

(12) United States Patent
Carlson et al.

(10) Patent No.: US 10,277,321 B1
(45) Date of Patent: Apr. 30, 2019

(54) ACQUISITION AND POINTING DEVICE, SYSTEM, AND METHOD USING QUAD CELL

(71) Applicant: BAE Systems Information and Electronic Systems Integration Inc., Nashua, NH (US)

(72) Inventors: Robert T Carlson, Bedford, NH (US); Amod V Dandawate, Basking Ridge, NJ (US); David A Haessig, Jr., Towaco, NJ (US); Dale A Rickard, Manassas, VA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 16/122,999

(22) Filed: Sep. 6, 2018

(51) Int. Cl.
  *H04B 10/112* (2013.01)
  *H04B 10/118* (2013.01)
  *H04B 10/50* (2013.01)
  *H04B 10/69* (2013.01)

(52) U.S. Cl.
  CPC ........ *H04B 10/118* (2013.01); *H04B 10/112* (2013.01); *H04B 10/503* (2013.01); *H04B 10/69* (2013.01)

(58) Field of Classification Search
  CPC ....................................... H04B 10/11–10/118
  USPC .................................................. 398/118–131
  See application file for complete search history.

(56) References Cited

U.S. PATENT DOCUMENTS

| 5,155,327 | A | * | 10/1992 | Hoag | G01S 3/7867 219/121.74 |
|---|---|---|---|---|---|
| 5,808,732 | A | | 9/1998 | Llewely | |
| 6,195,044 | B1 | | 2/2001 | Fowell | |
| 6,285,927 | B1 | | 9/2001 | Li et al. | |
| 6,483,621 | B1 | * | 11/2002 | Adams | H04B 10/1121 398/130 |
| 6,504,502 | B1 | | 1/2003 | Wu et al. | |
| 6,504,634 | B1 | * | 1/2003 | Chan | H04B 10/1125 398/129 |
| 6,941,076 | B1 | * | 9/2005 | Adams | H04B 10/1121 398/118 |
| 6,970,651 | B1 | * | 11/2005 | Schuster | H04B 10/1121 398/118 |
| 8,213,803 | B2 | | 7/2012 | Wu et al. | |
| 9,260,335 | B1 | * | 2/2016 | Miller | C03B 11/16 |
| 2004/0132412 | A1 | * | 7/2004 | Plett | H04B 10/07957 455/69 |
| 2009/0152391 | A1 | | 6/2009 | McWhirk | |

(Continued)

OTHER PUBLICATIONS

Pszczel, M.B., and D. Bucco. Review of techniques for in0flight transfer alignment. No. ARL-GW-TN-012. Aeronautical Research Labs Melbourne (Australia), 1992.

(Continued)

*Primary Examiner* — Li Liu

(74) *Attorney, Agent, or Firm* — Maine Cernota & Rardin

(57) ABSTRACT

The Quad Cell permits measurement of four quadrant signal powers simultaneously, metrics which are equal when the laser spot is at the desired zero location, at the center of the cell, the origin of the cells' axes. A control action acts upon the Quad Cell signals to move the laser spot toward the origin of the axes bisecting the four quadrants of the cell, moving the laser spot to the origin to achieve a null in the difference between these four signal levels.

20 Claims, 8 Drawing Sheets

(56) References Cited

U.S. PATENT DOCUMENTS

| | | |
|---|---|---|
| 2009/0214216 A1 | 8/2009 | Miniscalco |
| 2009/0324236 A1 | 12/2009 | Wu |
| 2011/0261187 A1 | 10/2011 | Wang |
| 2015/0219767 A1* | 8/2015 | Humphreys ............ G01S 19/43 342/357.26 |
| 2016/0043800 A1 | 2/2016 | Kingsbury |
| 2016/0046387 A1 | 2/2016 | Frolov |

OTHER PUBLICATIONS

Nguyen, Tam Nguyen Thuc. Laser beacon tracking for free-space optical communication on small-satellite platforms in low-earth orbit. Doss. Massachusetts Institute of Technology, 2015.

EP Search Report, EP 18160004.0, dated Jul. 10, 2018, 9 pages.

Guelman M et al., "Acquisition and pointing control for inter-satellite laser communications", IEEE Transactions on Aerospace and Electronic Systems, IEEE Service Center, Piscataway, NJ US, vol. 40, No. 4, Oct. 31, 2004 (Oct. 31, 2004), pp. 1239-1247, XP002623388, ISSN: 018-9251, D01: 10.1109/TAES.2004. 1386877. Section II; p. 1240-1242.

* cited by examiner

SATELLITE LASER-COM ENVIRONMENT

SIGNAL OF INTEREST BEACON STEPS FOR LASER COMMUNICATIONS

QUAD-IN-QUAD CELL DEVICE

400

405
QUAD SIGNAL MEASUREMENT FROM EACH ELEMENT OF QUAD CELL

410
QUAD PROCESS - QUAD DETECT INPUT

415
QUAD PROCESS - IDENTIFY INPUT TONE INDEX

420
QUAD PROCESS - COMBINE DETECT & TONE INPUTS

425
QUAD PROCESS - LPF

430
QUAD PROCESS - LOW SAMPLE RATE PROCESSING

435
QUAD PROCESS - QUAD DETECT, PULL-IN & COARSE TRACK CONTROL

440
QUAD PROCESS OUTPUT: QUAD ERROR; SUM; PIF SAMPLE CLOCK GEN

445
BEAM POINTING ANGLE OFFSET

QUAD CELL METHOD STEPS
FIG. 4

QUAD CELL DEVICE COMPONENTS DETAIL

QUAD CELL DEVICE COMPONENTS OUTPUT DETAIL

QUAD-IN-QUAD CELL METHOD STEPS

ACQUISITION AND POINTING DEVICE, SYSTEM, AND METHOD USING QUAD CELL

FIELD

The disclosure relates to wireless telecommunications, and more particularly, to a Quad Cell device, system, and method that enables robust wireless laser communications.

BACKGROUND

Due to an explosion in both civilian and military wireless communication, there is a growing need for high speed, reliable, secure, wireless communication of large amounts of data between communicating nodes. It should be noted that the term "wireless" is used throughout this disclosure to refer to any communication that does not depend on a physical link between sender and receiver. Hence, the term "wireless", as used herein, excludes fiber optic communication as well as communication over copper wires.

Traditional communication by wireless radio frequencies suffers from several shortcomings, many of which arise from the wide geographic dispersion of typical radio emissions (e.g. side lobes). Even when directional antennae and antenna arrays are used, radio signals are generally disbursed over large geographic areas, causing rapid attenuation of the signal strengths with distance, and also causing the signals to be relatively easy to intercept by unintended receivers. Due to the geographic overlap of radio communication signals, it is typically necessary to assign radio transmissions to specific frequency bands, which are often in limited supply. Furthermore, it is relatively easy for hostile antagonists to attempt to jam radio communications by transmitting radio signals at high energies that blanket a region of interest.

There are several approaches that attempt to address these problems of wireless radio communications. For example, bandwidth restrictions can be mitigated by opportunistically seeking and using bands that are nominally assigned to other uses, but are not currently in use. Various time and coding schemes can be employed to allow more than one communication link to share the same frequency band. So-called "multi-user" detection can also be employed to further distinguish signals transmitted on overlapping frequencies. The geographic range of wireless signals may also be extended by implementing signal relay nodes within a region of interest.

Security of wireless radio communications can be improved, for example, by employing secure transmission methods such as frequency "hopping," by adding pseudo-noise to communications, and by encoding communications with sophisticated, virtually impregnable cyphers. The Link 16 protocol is an example of this approach.

Nevertheless, all of these approaches to radio communication include significant disadvantages, such as increased cost and complexity, and message processing overhead that can slow communication and limit data transfer speeds.

Given these limitations, laser communication, or "lasercom," offers an attractive wireless alternative to radio communication, especially when point-to-point communication is required. Notably, the non-dispersed, focused character of laser communication intrinsically avoids most of the problems that are associated with radio communication. In particular, there is no need to assign frequency bands to lasercom users, because interference between laser signal beams is avoided so long as two beams are not directed to the same recipient. Laser signals experience very little attenuation as a function of distance, because the signal energy remains tightly focused in a beam. Communication security is also intrinsically high, as the interception of and interference with laser communications requires direct interception of a laser communication beam and/or focusing jamming beams directly at an intended signal receiver.

One important application that can benefit significantly from lasercom is satellite communications, where line-of-sight access is generally available, and where the communication distances are very great. Lasercom can provide communication data rates for satellites that are much higher than radio data rates, with unmatched anti-jam characteristics and an inherently low risk of communications intercept. Lasercom also eliminates the need for frequency planning and authorization, and circumvents the highly congested RF spectrum bandwidth constraints that limit the practical data rates available to users of RF links.

FIG. 1 depicts a satellite lasercom environment 100. Laser communications holds great promise for multi-Gbps (Giga-bits per second) connections 105 between space platforms 110, as well as connections 115 between ground-based nodes 120 and space platforms 110, owing to the availability of efficient, multi-watt laser sources and exceedingly high antenna gain, having beam widths of only 10-20 microradians and telescope apertures that are only four to eight inches in diameter. Even when much lower data rates of tens to hundreds of mega-bits per second (Mbps) are of interest, lasercom may be desirable due to its inherent Low Probability of Intercept (LPI), Low Probability of Detection (LPD), and anti-jam communications link security.

It should be noted that the disclosure herein is mainly presented with reference to satellite communication. However, it will be understood by those of skill in the art that the present disclosure is not limited to satellite communication, but also applies to other implementations of laser communication.

Of course, there are certain problems associated with laser communication that arise specifically from the focused nature of laser beams. In particular, it is necessary for communicating nodes to identify each other and align their lasers so as to effectively communicate. In the case of satellite laser-com, these identification and alignment problems are especially acute, because laser sources that are well separated by terrestrial standards, for example several miles apart from each other, may nevertheless appear to be almost geographically overlapping from the viewpoint of a satellite. Furthermore, thermal and other atmospheric effects can lead to both frequency (wavelength) and angular (apparent location) shifting of an incident laser communication beam, even after it is identified and aligned. The angular vibrational effects, together with other short-term mechanical instabilities of the satellite or other receiving node, are referred to herein collectively as "jitter."

FIG. 2 is a flow chart depicting steps 200 to establish and maintain laser communications. There are at least four steps to establish and maintain laser communications. First, a candidate light source, referred to herein as a "hot spot," is identified from within a scene of interest 205. Second, the hot spot is verified as being a communication signal and its transmission source is identified so as to determine if it is a signal of interest (verify it is a beacon having a specific, identifying characteristic, for example a particular beacon on/off frequency) 210. Third, the optics of the lasercom receiving system is aligned with the incoming beam (pull-in the Signal-of-Interest (SOI)) 215. Finally, once communication has been established, the beam is tracked during communication so that the alignment is maintained and the communication is not interrupted 220.

What is needed is a device, system, and method to economically, reliably, and quickly identify the presence of a Signal-of-Interest (SOI) in interference, pull this laser spot to the center of the field-of-view, and identify when the SOI is aligned with the center of the receiving fiber. The present disclosure is principally directed to identifying a SOI based on its beacon frequency, measuring the SOI location, and actuation of the location to pull it into the Quad Cell center, providing a fine adjustment of the SOI's location to align the received signal energy with the receive fiber, also nominally aligned with the center of the Quad Cell, and to do this while isolating strong interferers from the SOI when the interferers are in close proximity to the SOI.

SUMMARY

An embodiment provides a quad cell imaging device for identifying, centering, and tracking a light signal comprising a quad detector; and a quad processing module; the quad detector comprising at least one quad cell comprising four light detection cells; each of the quad cells comprising an output processed by an anti-alias filter and an analog to digital converter; the quad processing module comprising a tone index input and frequency module identifying a beacon frequency of a user to be received; a frequency downconverter which shifts quad cell signals from the beacon frequency to a center frequency of zero; a low pass filter module processing the output from each the quad cell detector; a quad detect, pull-in, and coarse track control module receiving output of the low pass filter, optionally after additional signal processing to further prepare signal; a reference clock generator providing input to a power in fiber sample clock generator and serving as a reference to a nutation drive module, generating drive signals, sin and cos, defining nutator and fiber location commands; output of the quad processing module comprising a quad error output; wherein the outputs from the quad processing module provide a beam pointing angle applied through a steering mirror to negate receive fiber offset error, whereby the laser light signal is identified, centered, and tracked. In embodiments the quad cell comprises a quad-in-quad cell comprising two quad cells comprising ring quad cells and inner quad cells. In other embodiments, input to the quad detector comprises an optical beacon at a frequency $f_{BK}$. In subsequent embodiments input to the quad detector comprises a laser signal. For additional embodiments input to the quad detector comprises a scintillation process. In another embodiment baseband signals are low pass filtered to remove spectral images, and then downsampled to reduce a sample rate to a lower value commensurate with lower bandwidth signals present at a downsampler input. For a following embodiment the tone frequency module comprises a tone frequency value generator that looks up a tone frequency $f_{BK}$ given a tone index K, receiving the tone index input K; and a tone processor receiving output from the tone frequency value generator and sample index input k. In subsequent embodiments output of the tone frequency value generator comprises $f_{BK}$. In additional embodiments the tone processor processing comprises a relationship of $2\pi f_{BK}\Delta T \cdot k$ and generates a phase angle time series consistent with that of a signal of interest being sought.

Another embodiment provides A quad cell method for identifying, centering, and tracking a light signal comprising in a quad detection module, detecting a signal of interest from processing of each quad cell in the quad detection module; in a quad processing module: receiving input from the quad detection module; receiving a tone index input; combining input from the quad detection module and the tone index; low pass filtering of the combined input from the quad detection module and the tone index; outputting of a quad error, a sum, and a power in fiber sample with a clock generator; and processing of the quad error, the sum, and the power in fiber sample with the clock generator to produce a beam pointing offset angle whereby the light signal is identified, centered, and tracked. In included embodiments the step of detecting a signal of interest from processing of each the quad cell in the quad detection module comprises inputting an optical beacon signal and a laser signal. In yet further embodiments the step of receiving input from the quad detector module comprises low pass filtering and analog to digital conversion of each input from each quad cell detector. In related embodiments the step of receiving tone index input comprises processing according to a phase angle of $2\pi f_{BK}\Delta T \cdot k$. For further embodiments the step of combining the input from the quad detection module and the tone index comprises combining an output of analog to digital converters and sine and cosine processed outputs of results of the processing according to a phase angle of $2\pi f_{BK}\Delta T \cdot k$. In ensuing embodiments the step of low pass filtering comprises filtering pairs of processed signal from each quad detector. For yet further embodiments, the step of detecting a signal of interest from processing of each quad cell in the quad detection module comprises ring quad cells and inner quad cells. For more embodiments, the step of quad detecting, pull-in, & coarse track controlling comprises outputting the quad error signal. Continued embodiments include the step of outputting of a quad error, a sum, and a power in fiber sample with a clock generator comprises input to a blended control and nutator processing. For additional embodiments, the step of processing of the quad error, the sum, and the power in fiber sample with clock generator to produce beam pointing offset angle comprises the beam pointing offset angle steering the light beam toward a center of a quad cell.

A yet further embodiment provides a quad cell system for identifying, centering, and tracking a light signal comprising a quad detector; and a quad processing module; the quad detector comprising at least one quad cell comprising four light detection cells; each of the quad cells comprising an output processed by a low pass filter and an analog to digital converter; the quad processing module comprising a tone index input; a tone frequency module receiving the tone index input; a low pass filter module processing the output from each the quad cell detector; a reference clock generator providing input to a power in fiber sample clock generator; wherein the quad processing module receives input from the quad detector module; receives a tone index input; combines input from the quad detection module and tone index; low pass filters combined input from the quad detection module and the tone index; quad detects, pulls-in, & coarse track controls; and wherein output of the quad processing module comprising a quad error output, a summation output, and a power in fiber sample clock generator output; wherein the outputs from the quad processing module provide a beam pointing angle offset whereby the laser light signal is identified, centered, and tracked.

BRIEF DESCRIPTION OF THE DRAWINGS

FIG. 4 is a flow chart for a Quad Cell method configured in accordance with an embodiment.

Figure 1:
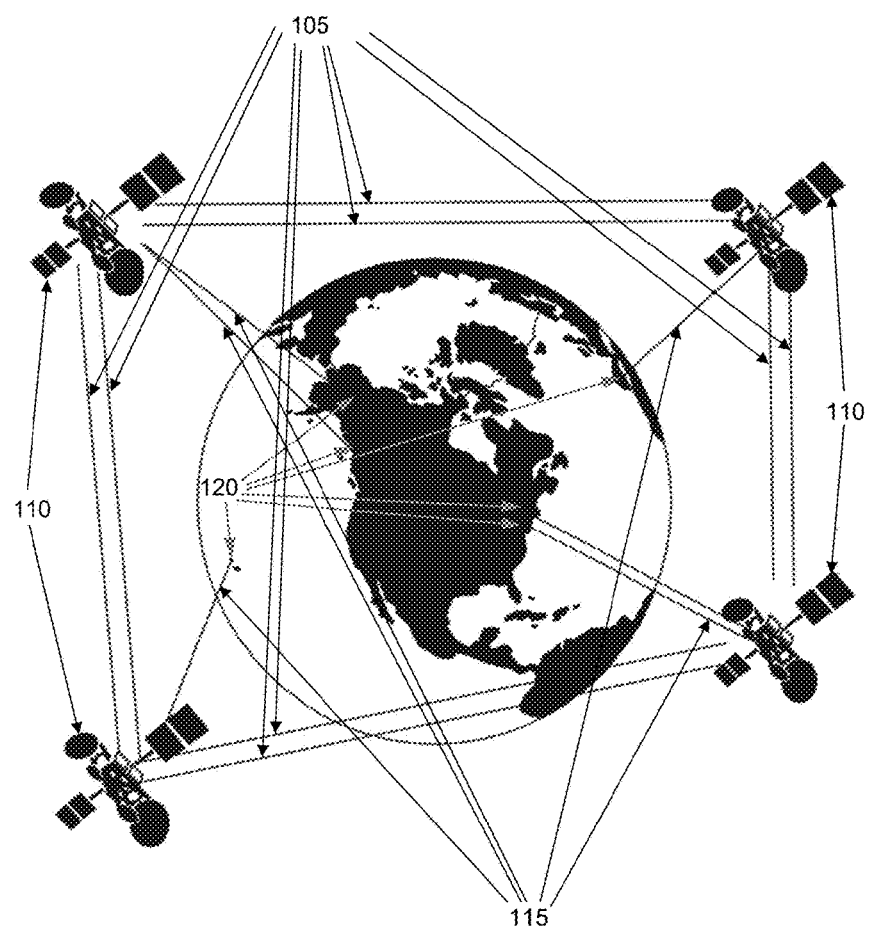
FIG. 1 illustrates lasercom communication between orbiting satellites, and between the satellites and ground-based nodes.
Figure 2:
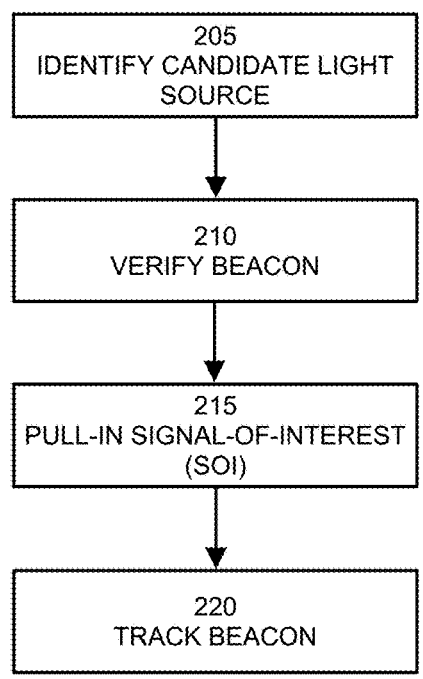
FIG. 2 is a generalized flow chart illustrating steps for aligning a lasercom receiving system with a transmitting node.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Each of U.S. patent application Ser. No. 15/457,081 filed Mar. 13, 2017 titled Celestial Navigation Using Laser Communication System; application Ser. No. 15/968,083 filed May 1, 2018 titled Apparatus and Method for Rapid Identification of Laser Communication Beacons, Ser. No. 16/000,991 filed Jun. 6, 2018 titled Apparatus and Method for Rapid Identification of Laser Communication Beacons, Ser. No. 16/001,225 filed Jun. 6, 2018 titled Flexible Design for a Tunable Optical Filter (TOF) Processing Block, Ser. No. 16/002,052 filed Jun. 7, 2018 titled Apparatus and Method for Rapid Identification of Candidate Laser Communication Beacons, and Ser. No. 16/003,690 filed Jun. 8, 2018 titled Pointing Control with Fiber Nutation is herein incorporated by reference in its entirety for all purposes.

During the startup (acquisition 205, 210 and pull-in 215) phase of a lasercom device, the system must identify the presence of a Signal-of-Interest (SOI) (i.e. the signal from a specific user or terminal) and must pull this laser spot to the center of the field-of-view, thereby aligning it with the laser fiber that receives the signal. It is necessary to identify the presence of the specific beacon associated with the signal-of-interest (SOI). It is also necessary to identify the location of that signal and to identify when the SOI is at the center of the field-of-view; i.e. the desired pointing direction. Embodiments solve the following problems; that of: identifying a SOI based on its beacon frequency and measurement of SOI location, and actuation of the location to pull it nominally on the Quad Cell center and precisely onto the laser receive fiber's center. Further, it is necessary to isolate strong interferers from the SOI when the interferers are in close proximity to the SOI to avoid a degradation in centroid tracking that the interferer can induce. This is accomplished with the Quad-in-Quad embodiment of this device which places a Quad Cell within a quadrature shaped outer Quad Ring. Embodiments apply to general optical signal detection, acquisition, and pull-in to the desired operating location when receiving a single signal, unencumbered by an adjacent interferer.

The Quad Cell permits measurement of four quadrant signal powers simultaneously, metrics which are equal when the laser spot is at the Quad Cell's zero location, at the center of the cell, the origin of the aforementioned axes. A control action acts upon the Quad Cell signals to move the laser spot toward the origin of the axes bisecting the four quadrants of the cell, moving the laser spot to the origin to achieve a null in the difference between these four signal levels. There will exist in any realworld system an offset bias error between the center of the Quad Cell and the center of the fiber receiving the laser signal and nominally aligned with the Quad Cell axes. The Nutator acts to detect these two offset angles (azimuth and elevation) and generates error correction angles that are applied to a steering mirror to adjust the laser spot's location and center it on the receive fiber. Embodiments work in the following cases: (1) when only one lasercom signal is present within the field of view of the Quad Cell, a signal that can be scintillating or non-scintillating, or (2) when multiple lasercom signals are present within the field-of-view of the Quad Cell and the interfering signals (i.e. those other than the Signal-of-Interest) are not scintillating. For embodiments, scintillation can cause a spreading of the received signal energy in frequency, causing embodiments to be unable to isolate the SOI from the interferers. In Case 1, when only a single lasercom signal is present, and therefore a scintillating interferer is not present, Quad Cell embodiments are able to identify and detect the associated beacon, namely the beacon frequency. In Case 2, when multiple lasercom signals are present, the same holds because only the SOI may be scintillating and the other interferers are not.

Figure 3:
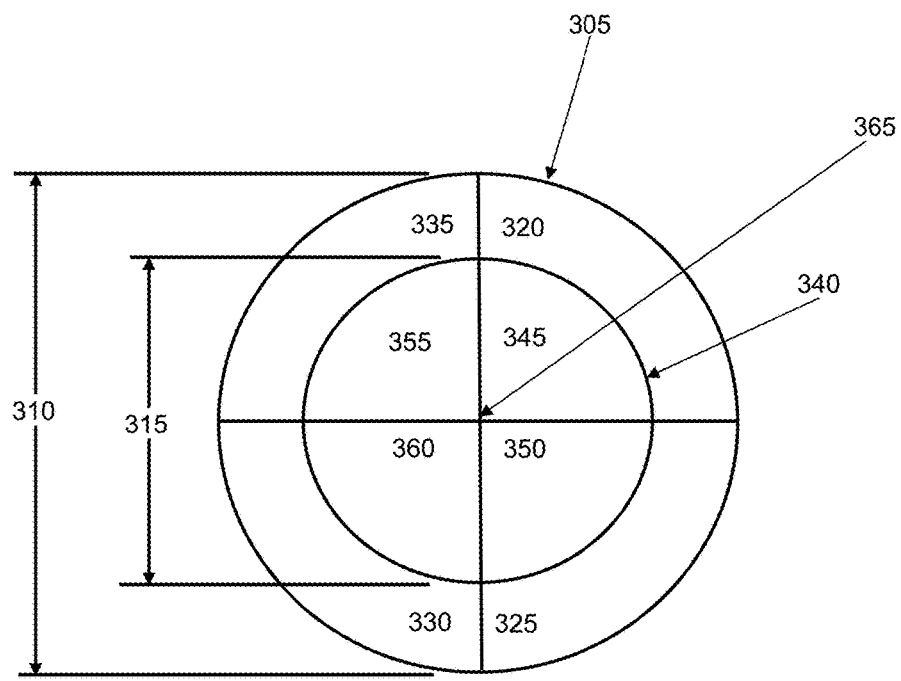
FIG. 3 depicts a Quad-In-Quad Cell device configured in accordance with an embodiment.

FIG. 3 depicts a Quad-in-Quad device embodiment 300. The device comprises a ring 305 having a large outer diameter 310 and a relatively small inner diameter 315. Ring 305 is broken into four quadrants (320, 325, 330, and 335). Inside inner diameter 315 of ring 305 is a four-element quadrature cell structure 340 (with cells 345, 350, 355, and 360) having center vertex points 365 that are common. The device allows a pull-in process based on the outer 305 and inner 340 quads, but then, after the SOI is pulled into inner quad 340, other modulated users, including much brighter, or bright DC sources in outer quadrants of 305 do not affect the inner quad 340 coarse-tracking. In addition, since coarse tracking is maintained using the inner quad 340 after pull-in is complete, if the fine-tracking loop is interrupted through a large disturbance of some sort, the availability of the inner quad signal information allows for immediate re-pull-in and restart of a nutator fine-tracking process as disclosed in U.S. patent application Ser. No. 16/003,690 which is herein incorporated in its entirety by reference for all purposes. The Quad Cell measures the four quadrant signal powers simultaneously. Metrics from each of the cells are equal when the laser spot is at the desired zero location (at the center of the cell axes). A control action based on the Quad Cell signals moves the laser spot toward the center to achieve a null in the difference among the cell signal levels.

Embodiments provide a less complex measurement device, involving only four or eight detected laser collection elements. It is therefore lower in cost and higher in reliability compared to devices that involve more than four or eight elements. Because the device only involves four or eight signal collection elements, the associated signal processing of that limited number of signals is much simpler than that involved for example with a Focal Plane Array (FPA) involving many more elements.

FIG. 4 is a flow chart for a Quad Cell method 400. The method comprises, in Quad Detection Module 505, Quad signal measurement of signal of interest from processing of each element of Quad Cell 405. In Quad Processing Module 510, receiving input from Quad Detector Module 410; identifying input tone index 415; combining input from Quad Detection Module and tone index 420; low pass filtering 425 of combined input from Quad Detection Module and tone index 420; low pass filtering 425; processing of low pass filtered output at a lower sample frequency (e.g. 1 kHz) 430; Quad Detect, Pull-in, & Coarse Track Control 435 of processing output; output of Quad error, Sum, and Power In Fiber (PIF) sample with clock generator 440; and processing of Quad error, Sum, and PIF sample with clock generator to produce beam pointing offset angle 445.

Figure 5:
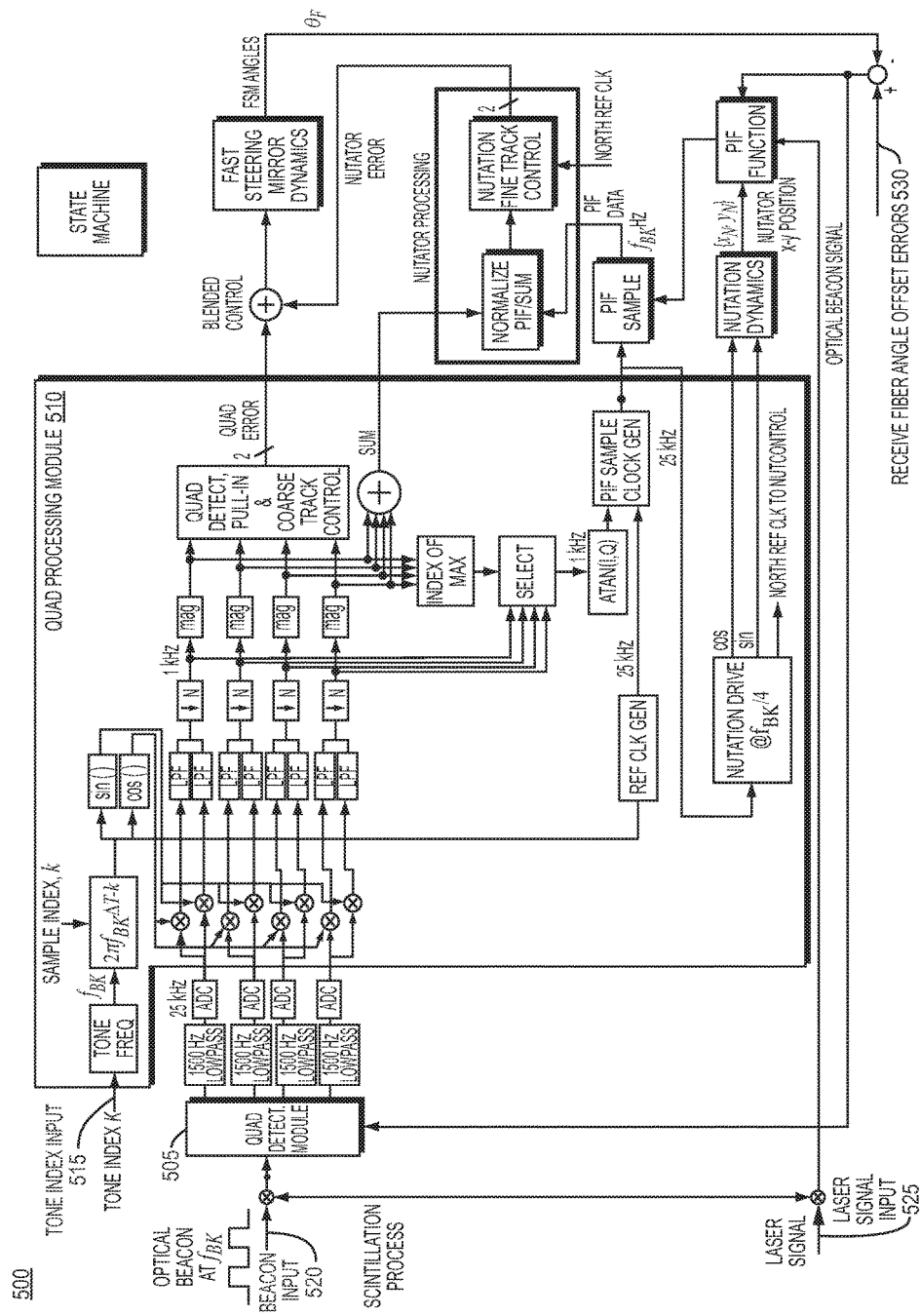
FIG. 5 is an overview schematic depicting Quad Cell device module components configured in accordance with an embodiment.

FIG. 5 an overview schematic 500 depicting Quad Cell device module components. Quad Cell device module components comprise Quad detection module 505 and Quad processing module 510. Inputs to Quad processing module 510 comprise Tone index K 515. Inputs to Quad detection module 505 comprise beacon input 520 and laser signal input 525. An additional input comprises the physical angles caused by misalignment of the receive fiber with the center of the Quad cell, the Receive Fiber Angle Offset Errors 530.

Figure 6:
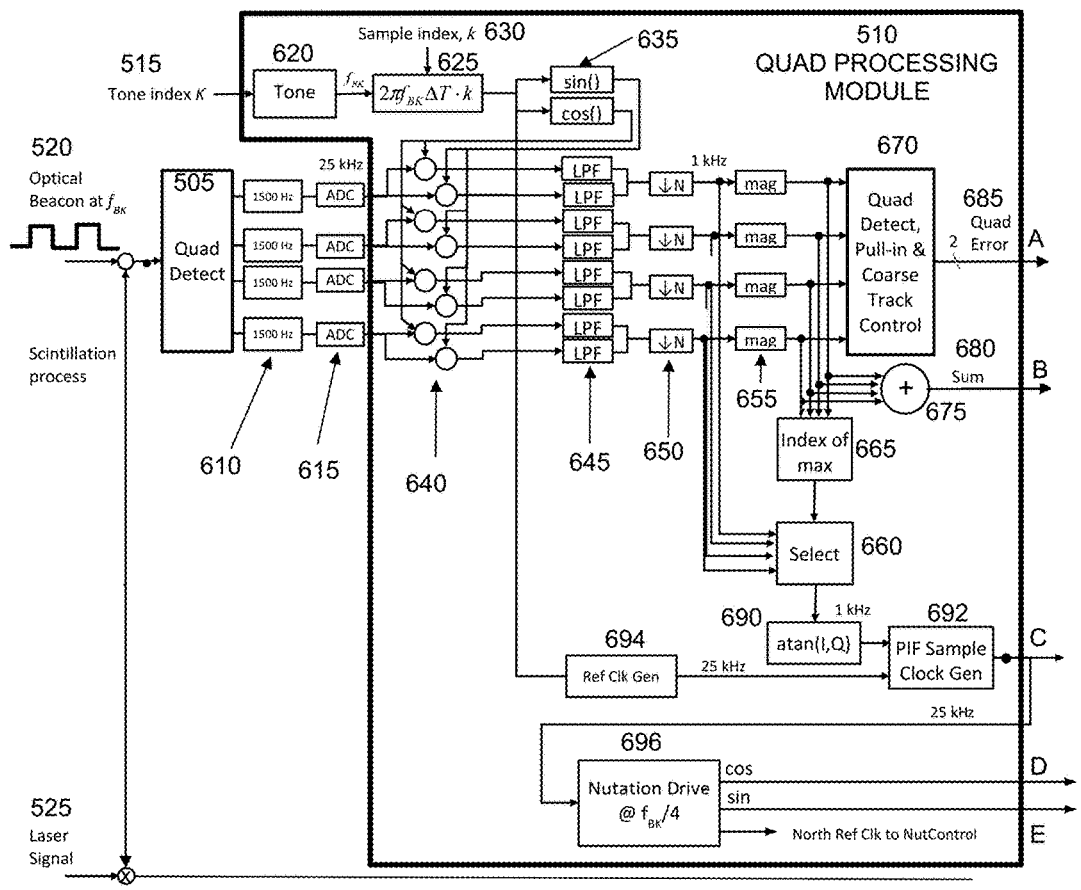
FIG. 6 is a detail schematic depicting Quad Cell processor device processing components configured in accordance with an embodiment.

FIG. 6 is a detail schematic 600 depicting Quad Cell device module components. As mentioned, Quad Cell detection module 505 comprises inputs of optical beacon (at $f_{BK}$) 520 and laser signal 525. The received signal level is an input typically having a time varying (scintillating) power level. Quad detector 505 has four outputs 605 (one for each cell) processed through anti-alias filter (1500 Hz lowpass filters in embodiments) 610 and 25 kHz analog to digital converters (ADC) 615. The quad-in-quad has eight outputs (not shown). Outputs of ADCs are input to Quad processing module 510. Tone index K 515 is also an input to Quad processing module 510. Tone index input K 515 is provided to a tone frequency lookup table which converts from beacon frequency index to the actual frequency value—a lookup table defining the specific frequency associated with index K 620. Tone frequency $f_{BK}$ output is provided to processing step 625 ($2\pi f_{BK}\Delta T \cdot k$) which includes a sample index, k input 630. Output of processing step 625 ($2\pi f_{BK}\Delta T \cdot k$) is a phase angle provided to reference clock generator 694 and sine/cosine modules 635. These are used in demodulation 640 of the inputs from the 4 cells of the Quad Cell 505 after passing those signals through low pass anti-alias filters 610 and Analog-to-Digital Converters 615. This demodulation process results in a shifting of the center frequency of the input signal by a frequency having the index k. The center frequency of this signal after the shift is zero, also referred to as DC or baseband by those skilled in the art. Those baseband signals are low pass filtered 645 to remove spectral images, and then downsampled 650 to reduce the sample rate to a lower value commensurate with the lower bandwidth signals that now are present at the downsampler input. These signals pass through a magnitude function 655 converting them from complex samples to real values with the magnitude of the complex values Output from the magnitude functions 655 are provided to the Quad Detect, Pull-in, & Coarse Track Control module 670 and the summation node 675. The Index of max operation 665 identifies which of the four quad paths has the highest level of signal energy, and provides an input to Select module 660 which passes the strongest quad output signal to a tan(I,Q) 690. The a tan(I,Q) operation generates the phase angle associated with the input beacon signal relative to the demodulation signals 640. The output from a tan(I,Q) 690 is compared with the time reference produced by the Ref Clk Gen operation 694 to produce a timing reference used to trigger the sampling of the beacon signal in the Power In Fiber (PIF) Sample Clock Gen operation 692 indicating that the beacon signal is in an ON time period. Quad processing module 510 output comprises summation node 675 output 680, Quad Detect, Pull-in, & Coarse Track Control module 670 output 685, and output of PIF Sample with Clock Generator 692. Output of PIF Sample with Clock Generator 692 is also an input to a Nutation drive 696 which provides cos output D and sin output E to Nutation Dynamics which, in combination with the Quad processing module 510 outputs, provides beam pointing angle output 530 used to align the system for laser communication.

Figure 7:
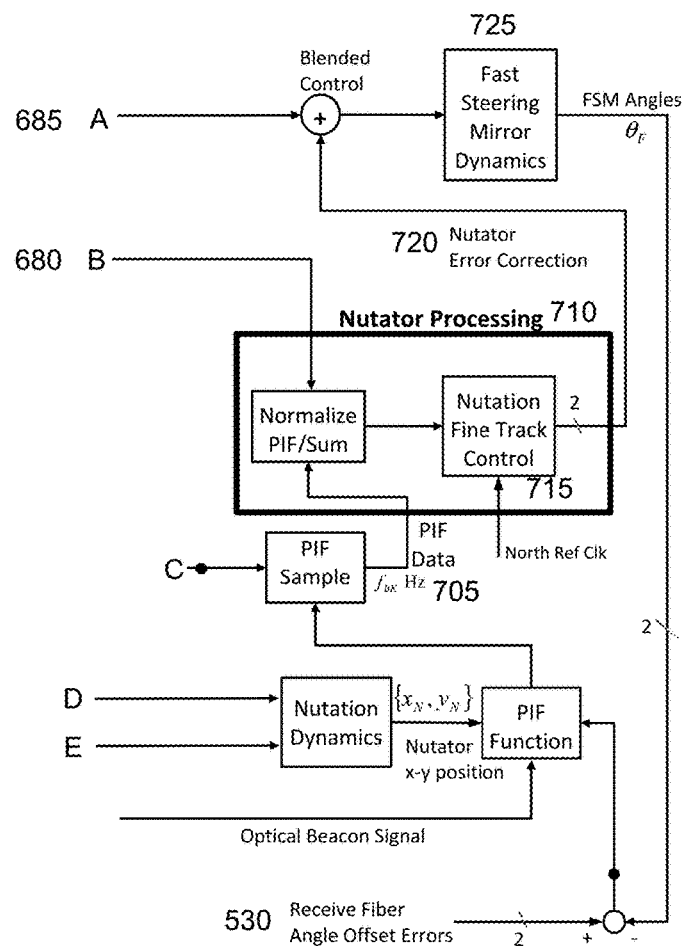
FIG. 7 depicts Quad Cell device components output detail configured in accordance with an embodiment.

FIG. 7 depicts Quad Cell device components output detail 700. Quad Sum signal 675 and the Power In Fiber (PIF) Sample 705 operations are inputs to the Nutator Processing operation 710 (as disclosed in U.S. patent application Ser. No. 16/003,690), with the Sum signal used to normalize the PIF data sample to mitigate the impact of signal level scintillation on the data entering the Nutator Fine Track Control operation 715 which processes groups of 4 samples measured at the 4 points representing the top, right, bottom, and left PIF signal levels. The Nutation Fine Track Control operation computes a control signal, the Nutator Error 720, that drives the Fast Steering Mirror (FSM) Dynamics 725 to adjust the FSM angles to counteract the Beam Pointing Bias Errors 530 thereby causing the laser spot to be nominally centered on the fiber, and causing the PIF at all 4 points to be nominally equal, the objective of the Nutator Process 710.

Figure 8:
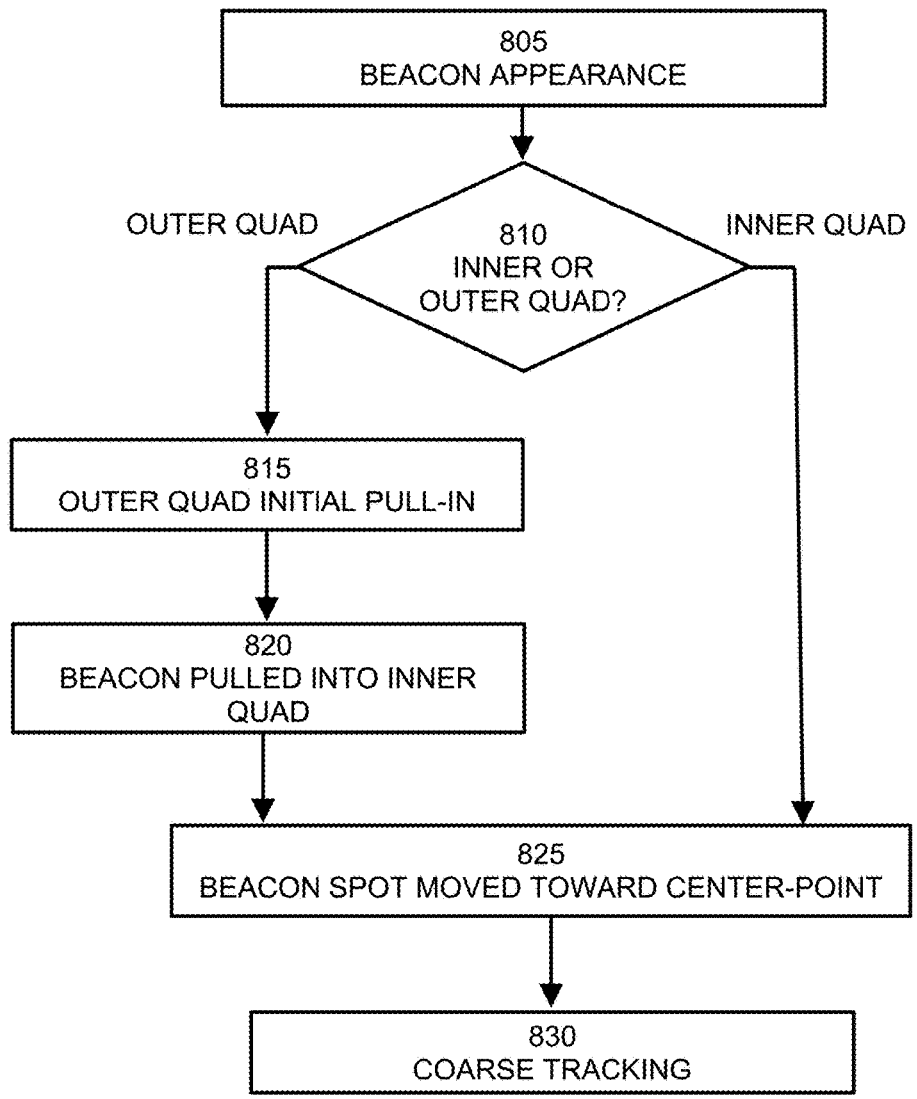
FIG. 8 is a flow chart for a Quad-In-Quad Cell method configured in accordance with an embodiment.

FIG. 8 is a Quad-in-Quad Cell method embodiment 800. The method comprises a pull-in process beginning with a beacon appearance 805 that may start either in the outer Quad or in the inner Quad 810, depending on where the laser beacon appears. If appearing in the outer Quad, an initial pull-in process 815 based on outer Quad 305 is applied, moving the spot toward the Quad center-point 820 and, in doing so, passing across the inner Quad 340 as well, to the center of the Quad, as in the single Quad case 825. The use of an inner and outer Quad arrangement provides spatial separation between modulated users, including much brighter, or bright DC sources, relegating them to the outer quadrants of 305 when the desired beacon with specified beacon frequency is at the center, where their affect on the desired beacon signal in the inner quad 340 and the impact on the accuracy of coarse-tracking 830 is greatly lessened. In addition, since coarse tracking 830 is maintained using the inner Quad 340 after pull-in is complete, if the fine-tracking loop is interrupted through a large disturbance of some sort, the availability of the inner Quad signal information allows for rapid re-pull-in and restart of a nutator fine-tracking process.

The computing system used for the Quad Cell acquisition and pointing system for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments.

For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A quad cell imaging device for identifying, centering, and tracking a light signal comprising:
    a quad detector; and
    a quad processing module;
    said quad detector comprising at least one quad cell comprising four light detection cells;
        each of said quad cells comprising an output processed by an anti-alias filter and an analog to digital converter;
    said quad processing module comprising:
        a tone index input and frequency module identifying a beacon frequency of a user to be received;
        a frequency downconverter which shifts quad cell signals from said beacon frequency to a center frequency of zero;
        a low pass filter module processing said output from each said quad cell detector;
        a quad detect, pull-in, and coarse track control module receiving output of said low pass filter, optionally after additional signal processing to further prepare signal;
        a reference clock generator providing input to a power in fiber sample clock generator and serving as a reference to a nutation drive module, generating drive signals, sin and cos, defining nutator and fiber location commands;
        output of said quad processing module comprising a quad error output;
    wherein said outputs from said quad processing module provide a beam pointing angle applied through a steering mirror to negate receive fiber offset error, whereby said laser light signal is identified, centered, and tracked.

2. The device for identifying, centering, and tracking a light signal of claim 1 wherein said quad cell comprises a quad-in-quad cell comprising:
    two quad cells comprising ring quad cells and inner quad cells.

3. The device for identifying, centering, and tracking a light signal of claim 1 wherein input to said quad detector comprises an optical beacon at a frequency $f_{BK}$.

4. The device for identifying, centering, and tracking a light signal of claim 1 wherein input to said quad detector comprises a laser signal.

5. The device for identifying, centering, and tracking a light signal of claim 1 wherein input to said quad detector comprises a scintillation process.

6. The device for identifying, centering, and tracking a light signal of claim 1 wherein baseband signals are low pass filtered to remove spectral images, and then downsampled to reduce a sample rate to a lower value commensurate with lower bandwidth signals present at a downsampler input.

7. The device for identifying, centering, and tracking a light signal of claim 1 wherein said tone frequency module comprises:
    a tone frequency value generator that looks up a tone frequency $f_{BK}$ given a tone index K, receiving said tone index input K; and
    a tone processor receiving output from said tone frequency value generator and sample index input k.

8. The device for identifying, centering, and tracking a light signal of claim 7 wherein output of said tone frequency value generator comprises $f_{BK}$.

9. The device for identifying, centering, and tracking a light signal of claim 7 wherein said tone processor processing comprises a relationship of $2\pi f_{BK} \Delta T \cdot k$ and generates a phase angle time series consistent with that of a signal of interest being sought.

10. A quad cell method for identifying, centering, and tracking a light signal comprising:
    in a quad detection module:
        detecting a signal of interest from processing of each quad cell in said quad detection module;
        anti-alias filtering and analog to digital conversion of each input from each quad cell detector;
    in a quad processing module:
        receiving input from said quad detection module;
        receiving a tone index input and identifying beacon frequency;
        combining input from said quad detection module and said tone index;

anti-alias filtering of said combined input from said quad detection module and said tone index;

downsampling said combined input after the anti-alias filtering to reduce a sample rate;

quad detecting, pull-in, and coarse track controlling said combined input after downsampling;

outputting of a quad error, a sum, and a power in fiber sample with a clock generator; and processing of said quad error, said sum, and said power in fiber sample with said clock generator to produce a beam pointing offset angle whereby said light signal is identified, centered, and tracked.

11. The method for identifying, centering, and tracking a light signal of claim 10, wherein said step of detecting a signal of interest from processing of each said quad cell in said quad detection module comprises:

inputting an optical beacon signal and a laser signal.

12. The method for identifying, centering, and tracking a light signal of claim 10, wherein said step of receiving tone index input comprises:

processing according to a phase angle of $2\pi f_{BK} \Delta T \cdot k$.

13. The method for identifying, centering, and tracking a light signal of claim 10, wherein said step of combining said input from said quad detection module and said tone index comprises:

combining an output of analog to digital converters and sine and cosine processed outputs of results of said processing according to a phase angle of $2\pi f_{BK} \Delta T \cdot k$.

14. The method for identifying, centering, and tracking a light signal of claim 10, wherein said step of low pass filtering in the quad processing module comprises:

filtering pairs of processed signal from each quad detector.

15. The method for identifying, centering, and tracking a light signal of claim 10, wherein said step of detecting a signal of interest from processing of each quad cell in said quad detection module comprises ring quad cells and inner quad cells.

16. The method for identifying, centering, and tracking a light signal of claim 10, wherein said step of quad detecting, pull-in, & coarse track controlling comprises:

outputting said quad error signal.

17. The method for identifying, centering, and tracking a light signal of claim 10, wherein said step of outputting of a quad error, a sum, and a power in fiber sample with a clock generator comprises:

input to a blended control and nutator processing.

18. The method for identifying, centering, and tracking a light signal of claim 10, wherein said step of processing of said quad error, said sum, and said power in fiber sample with clock generator to produce beam pointing offset angle comprises:

said beam pointing offset angle steering said light beam toward a center of a quad cell.

19. The method for identifying, centering, and tracking a light signal of claim 10, wherein said anti-alias filtering is low pass filtering or band pass filtering.

20. A quad cell system for identifying, centering, and tracking a light signal comprising:

a quad detector; and a quad processing module;

said quad detector comprising at least one quad cell comprising four light detection cells;

each of said quad cells comprising an output processed by a low pass filter and an analog to digital converter;

said quad processing module comprising:

a tone index input;

a tone frequency module receiving said tone index input;

a low pass filter module processing said output from each said quad cell detector;

a downsampler downsampling the output from the low pass filter module;

a reference clock generator providing input to a power in 15 fiber sample clock generator;

wherein said quad processing module receives input from said quad detector module;

receives a tone index input;

combines input from said quad detection module and tone index;

low pass filters combined input from said quad detection module and said tone index;

reduces a sample rate to a lower value;

quad detects, pulls-in, & coarse track controls; and wherein output of said quad processing module comprising a quad error output, a summation output, and a power in fiber sample clock generator output;

wherein said outputs from said quad processing module provide a beam pointing angle offset whereby said laser light signal is identified, centered, and tracked.

\* \* \* \* \*